United States Patent
Stefani

(10) Patent No.: US 8,554,862 B2
(45) Date of Patent: Oct. 8, 2013

(54) METHOD AND APPARATUS FOR THE COLLECTION, FORMATTING, DISSEMINATION, AND DISPLAY OF TRAVEL-RELATED INFORMATION ON A LOW-COST DISPLAY BANK

(75) Inventor: Rolf R. Stefani, West River, MD (US)

(73) Assignee: Arinc Incorporated, Annapolis, MD (US)

( * ) Notice: Subject to any disclaimer, the term of this patent is extended or adjusted under 35 U.S.C. 154(b) by 120 days.

(21) Appl. No.: 12/982,076

(22) Filed: Dec. 30, 2010

(65) Prior Publication Data

US 2011/0093558 A1 Apr. 21, 2011

Related U.S. Application Data

(63) Continuation of application No. 12/789,626, filed on May 28, 2010.

(60) Provisional application No. 61/346,264, filed on May 19, 2010, provisional application No. 61/244,286, filed on Sep. 21, 2009.

(51) Int. Cl.
*G06F 15/16* (2006.01)
*H04N 7/18* (2006.01)
*G08G 1/00* (2006.01)

(52) U.S. Cl.
USPC .............................. 709/208; 725/75; 340/901

(58) Field of Classification Search
None
See application file for complete search history.

(56) References Cited

U.S. PATENT DOCUMENTS

| 7,243,024 B2 | 7/2007 | Endicott | |
|---|---|---|---|
| 8,214,864 B2 * | 7/2012 | Emoto et al. | 725/75 |
| 2008/0195977 A1 * | 8/2008 | Carroll et al. | 715/853 |
| 2012/0001029 A1 * | 1/2012 | Kondo et al. | 246/108 |

OTHER PUBLICATIONS

CONRAC; High Performance Display; Airport Solutions; TEC CONRAC Technology; www.conrac.ru/images/cat/lin/2.pdf; 2007.

* cited by examiner

*Primary Examiner* — Joseph E. Avellino
*Assistant Examiner* — Wen-Tai Lin
(74) *Attorney, Agent, or Firm* — Ronald E. Prass, Jr.; Prass LLP

(57) ABSTRACT

A low-cost display bank that displays travel-related information in a public travel-related area and includes one or more slave low-cost display units, and a master low-cost display unit that includes a communication interface that receives travel-related information, a display bank control unit that sends identification information to a display bank data management unit through the communication interface, receives a display bank unit profile containing display parameters based on the identification information through the communication interface, receives travel-related information from the display bank data management unit in accordance with the received display parameters through the communication interface, sends the received travel-related information intended to be displayed on the one or more slave low-cost display units to the one or more slave low-cost display units, and displays the received travel-related information on the master low-cost display unit and the one or more slave low-cost display units based on the received display parameters.

8 Claims, 8 Drawing Sheets

METHOD AND APPARATUS FOR THE COLLECTION, FORMATTING, DISSEMINATION, AND DISPLAY OF TRAVEL-RELATED INFORMATION ON A LOW-COST DISPLAY BANK

PRIORITY INFORMATION

This non-provisional application claims priority from U.S. Provisional Patent Application No. 61/346,264, filed, filed May 19, 2010, entitled "SMART LOW-COST DISPLAY DEVICES," and is a continuation-in-part of co-pending U.S. patent application Ser. No. 12/789,626, filed May 28, 2010 (published as U.S. Patent Application Publication No. 2011-0072076 A1 on Mar. 24, 2011), entitled "METHOD AND APPARATUS FOR THE COLLECTION, FORMATTING, DISSEMINATION, AND DISPLAY OF INFORMATION ON LOW-COST DISPLAY DEVICES," which in turn claims priority from U.S. Provisional Patent Application No. 61/244,286, filed Sep. 21, 2009, entitled "METHOD AND APPARATUS FOR THE COLLECTION, FORMATTING, DISSEMINATION, AND DISPLAY OF INFORMATION ON LOW-COST DISPLAY DEVICES," the contents of which are incorporated herein by reference in their entireties.

BACKGROUND OF THE DISCLOSED EMBODIMENTS

1. Field of the Disclosed Embodiments

The disclosed embodiments relate to the collection, formatting, dissemination, and display of travel-related information on a low-cost display bank.

2. Introduction

Ready access to information is critical to many aspects of people's lives. The information required often exists in many places, but not always in the places the information would be most useful. As an example, the information about the arrival, departure, delay, or cancellation of various modes of travel (aircraft, train, bus, etc.) exists in various databases and other locations for specific uses, such as displaying flight information to visitors to an airport, but that information is typically confined to the airport premises, or the airport's or airline's web site. There are many other locations and potential consumers of the data, but the cost of distributing the data using conventional technology is too high due to expensive display technology, expensive communication links, etc.

For example, displays showing travel information, such as Flight Information Displays (FIDS), are widely used in society today. The 2 basic types of FIDS displays are 1) multiple display or monitor groups forming banks of displays each showing a static image of a specified number of flight entries, and, 2) single display/monitor installations which scroll through a number of pages/images to accommodate numbers of pages required to ultimately show all flights for a specific facility/configuration.

With respect to the bank of FIDS displays, communications can be cumbersome and problematic if all of the displays are wired and each being fed information from a remote source. Since a remote source (e.g., a remote content data server) must talk to many displays over a network, this large message traffic may result in delays, lost packets, conflicts, and network congestion that may affect other travel services. Furthermore, if a display fails, there is no easy way for the remote device to reconfigure the data to displayed in another manner on the remaining displays.

Another problem or issue inherent in these FIDS systems is that it is somewhat time consuming and difficult to locate the flight of interest by the specific user. In situations where there could be 8 displays each displaying 30 flights sorted in various ways, finding specific flight information is difficult. In situations where there is a single display being used to display as many as 25 pages of flights with as many as 30 flights per page, the delay between pages and the difficulty of locating/identifying a specific flight information may take an extremely long time or be almost impossible altogether.

SUMMARY OF THE DISCLOSED EMBODIMENTS

A low-cost display bank that displays travel-related information in a public travel-related area and includes one or more slave low-cost display units, and a master low-cost display unit that includes a communication interface that receives travel-related information, a display bank control unit that sends identification information to a display bank data management unit through the communication interface, receives a display bank unit profile containing display parameters based on the identification information through the communication interface, receives travel-related information from the display bank data management unit in accordance with the received display parameters through the communication interface, sends the received travel-related information intended to be displayed on the one or more slave low-cost display units to the one or more slave low-cost display units, and displays the received travel-related information on the master low-cost display unit and the one or more slave low-cost display units based on the received display parameters.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DESCRIPTION OF THE DISCLOSED EMBODIMENTS

Figure 1:
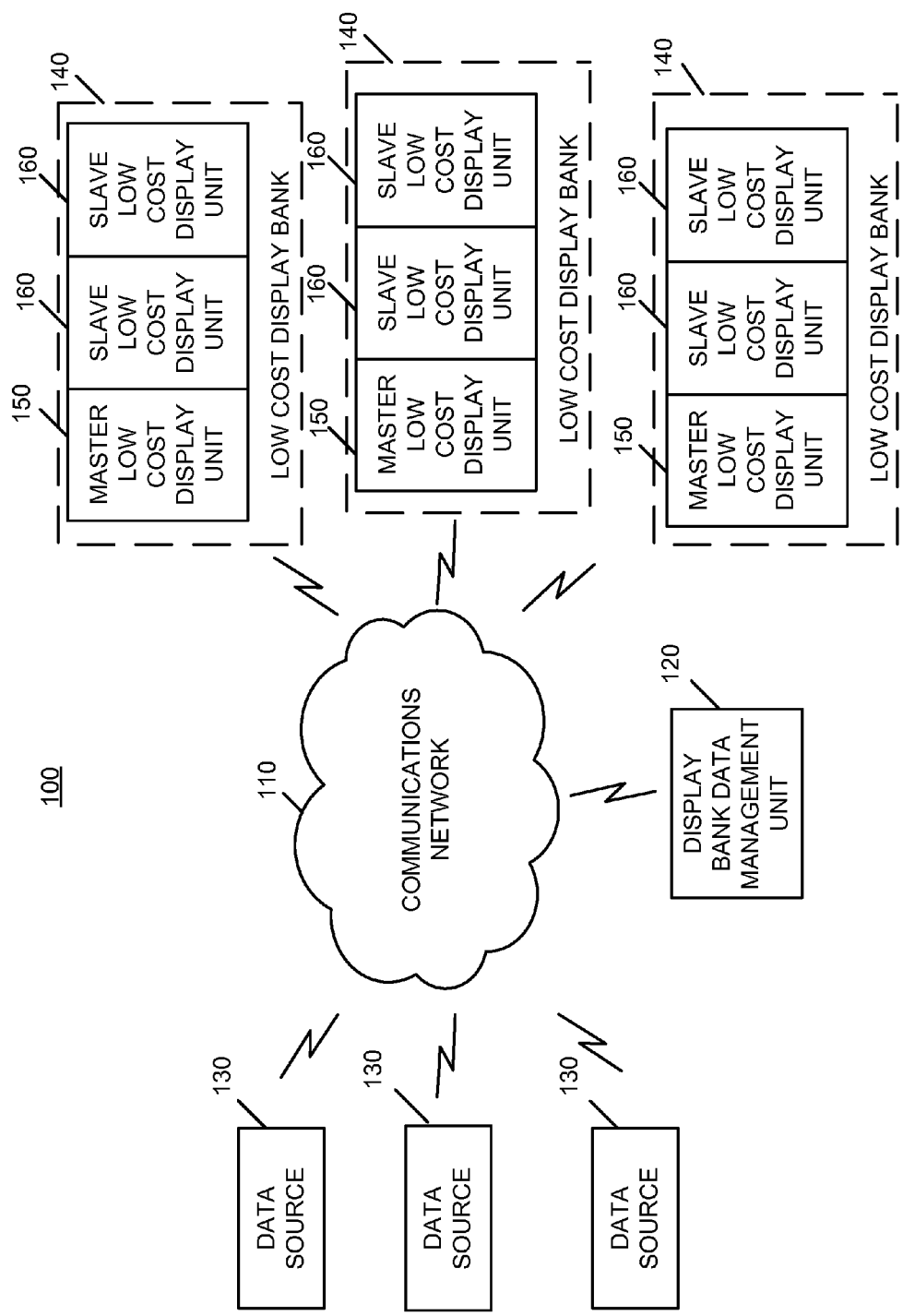
FIG. 1 is an exemplary diagram of a low-cost display bank management environment in accordance with a possible embodiment of the disclosure.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses airport, aircraft, airline and travel-related uses for the disclosed embodiments, the disclosed embodiments are by no means limited to that area and may be applied to a wide variety of environment and uses, such as railway stations, hotels, subway stations, bus stations, etc.

The proposed disclosed system and method concerns a method and apparatus for the access, combination, formatting, dissemination, and display of various types of visual and/or audible information on various low-cost display technologies.

The low-cost display technologies may include a bank (i.e., more than one) of display devices that are becoming more readily available on the market and with little or no modification to the hardware or operating system, can be connected via a wireless or wired network in order to receive information for display. The low-cost display bank may support network connectivity that is always connected, or only sometimes connected. For example, if a device has a constant network connection, information may be streamed in a continuous manner to the device from the server (using HTTP/HTTPS or other protocols over TCP/IP). If the device is only occasionally connected (e.g., in a mobile installation in which the vehicle is connected only during certain points of its journey), data may be refreshed during connectivity and the data may be displayed until a data validity expiration time is reached, or until new data is retrieved once connectivity is restored.

In addition, the data feeder service, in conjunction with the devices, may be configured to display information relevant to a particular portion of a journey. For example, a bus (such as an airport or rental car shuttle) traveling toward an airport may display flight departure information, while the same bus traveling away from the airport and perhaps toward the parking lot or rental car facility may display local traffic and weather conditions, advertisements, etc.

Data may be retrieved or be received from various sources over a public or private network by a central server process. The data retrieval and storage process may normalize (if necessary) the data and store it in a relational database, for example. The database may also contain profile information for displays containing details such as display size, screen resolution, firmware revision, types of data to display, etc.

The data formatting central server process may retrieve the data for a bank of displays from the database based upon the display profile, and assemble data into information to be displayed. Information could be in the form of XML, RSS, static images, HTML pages, etc., for example.

The information broadcast central server process may receive information bound for a display bank and either transmit it to the display bank, or hold it until a display retrieves it (the system supports the concept of the display acting as a client or a server).

The information broadcast server process may also support other types of displays or devices, such as a software client on a personal computer, a web browser, an electronic tablet device, or even a kiosk.

All aspects of the above processes and the system as a whole may be controlled by the system management console, through which data sources and display profiles may be added, modified, or deleted. Thus, a single (or distributed) information management unit may perform all or some of the above-described processes. One of the primary advantages of the disclosed embodiments is that it requires very little bandwidth, thus saving on communications costs and capabilities.

In the display unit bank, one or more of the plurality of display units in the bank may be a "smart" display unit. The smart display may act as a master of the other displays. In this regard, the smart display may have communication capabilities (e.g., wired, wireless, Wi-Fi, RF, remote control, etc.) to receive the data from a network or wired/wireless data source (e.g., Internet, intranet, local area network, wide-area network, Wi-Fi, etc.) to be displayed on the entire bank of displays from a remote content management server, data source server, etc.

The smart (or master) display unit may then disseminate the information to be displayed to the slave display units in the display unit bank. The slave display units will then display the information as directed by at least one of the master display unit, a content management unit, remote control, or other content display control mechanism. For example, the smart display unit may receive flight and weather data and designate displays units 1 and 2 to display departures, display units 3 and 4 to display arrival and display unit 5 to display current weather in the airport city and possibly other destinations. As another example, one or more of the displays could be used to designate baggage information, subway schedules, rental car information, advertisements, video clips, commercials, multimedia, etc. As such, the low-cost display unit may be operated as a "cloud" technology.

FIG. 1 is an exemplary diagram of a low-cost display bank management environment 100 in accordance with a possible embodiment of the disclosure. The low-cost display bank management environment 100 may include a display bank data management unit 120, one or more data sources 130, one or more low-cost display banks 140, all connected through communications network 110. Note that although the connections in FIG. 1 are shown as a wireless configuration, one or more of these connections may also be wired.

Communications network 110 may represent any communications network used to communicate with other entities, including the Internet, an intranet, a radio network, a wireless network, etc. The one or more data sources 130 may be include one or more databases that contain information for dissemination to the display bank management unit 120 for formatting and transmitting to one or more display banks 140 for display. The data sources 130 may also be the receiving and forwarding hub for real-time or near-real time information, such as flight/train status information, current weather conditions, etc.

The display bank management unit 120 may be any server, computer, processing device, personal digital assistant (PDA), or other similar device capable of storing and managing media publications, receiving, formatting and processing FIDS data, and other documents and products. The one or more low-cost display banks 140 may include a master low-cost display unit 150 and one or more slave low-cost display units 160.

The master low-cost display unit 150 may represent a local or remote low-cost display device that is capable of displaying (or playing) data to passengers and/or customers that has been received from one or more data source 130 that has been received and formatted by the display bank management unit 120. The master and slave low-cost display units 150, 160 may be a display unit such as an electrophoretic (e-paper) display, or other low-cost display unit, etc., for example. The slave low-cost display unit 160 may receive information from the master low-cost display unit 150 for display. If the master and slave low-cost display units 150, 160 are e-paper display units, the e-paper display units are a low-cost display unit that may be viewed in lighting conditions similar to paper and may not require any backlighting, which reduces power cost and increases longevity of the display.

In the low-cost display bank 140, the master low-cost display unit 150 may be a "smart" display unit. The "smart" master low-cost display unit 150 may act as a master of the other displays. In this regard, the master low-cost display unit 150 may have communication capabilities (e.g., wired, wireless, Wi-Fi, RF, remote control, etc.) to receive the data from a network or wired/wireless data source (e.g., Internet, intranet, local area network, wide-area network, Wi-Fi, etc.) to be displayed on the entire low-cost display bank 140 from the display bank data management unit 120, data source server 130, etc.

The master low-cost display unit 150 may then disseminate the information to be displayed to the slave low-cost display units 160 in the low-cost display bank 140. The slave low-cost display units 160 may then display the information as directed by at least one of the master low-cost display unit 150, a remote control, or other content display control mechanism. For example, in a low-cost display bank 140 having 4 low-cost display units 150, 160, the master low-cost display unit 150 may receive flight and weather data and designate slave low-cost displays units 160 #1 and #2 to display departures, slave low-cost display units 160 #3 and #4 to display arrival, and the master low-cost display unit 150 #5 to display current weather in the airport city and possibly other destinations. As another example, one or more of the low-cost displays units 150, 160 may be used to designate baggage information, subway schedules, rental car information, advertisements, etc. As such, the low-cost display units 150, 160 may be operated as a "cloud" technology.

Figure 2:
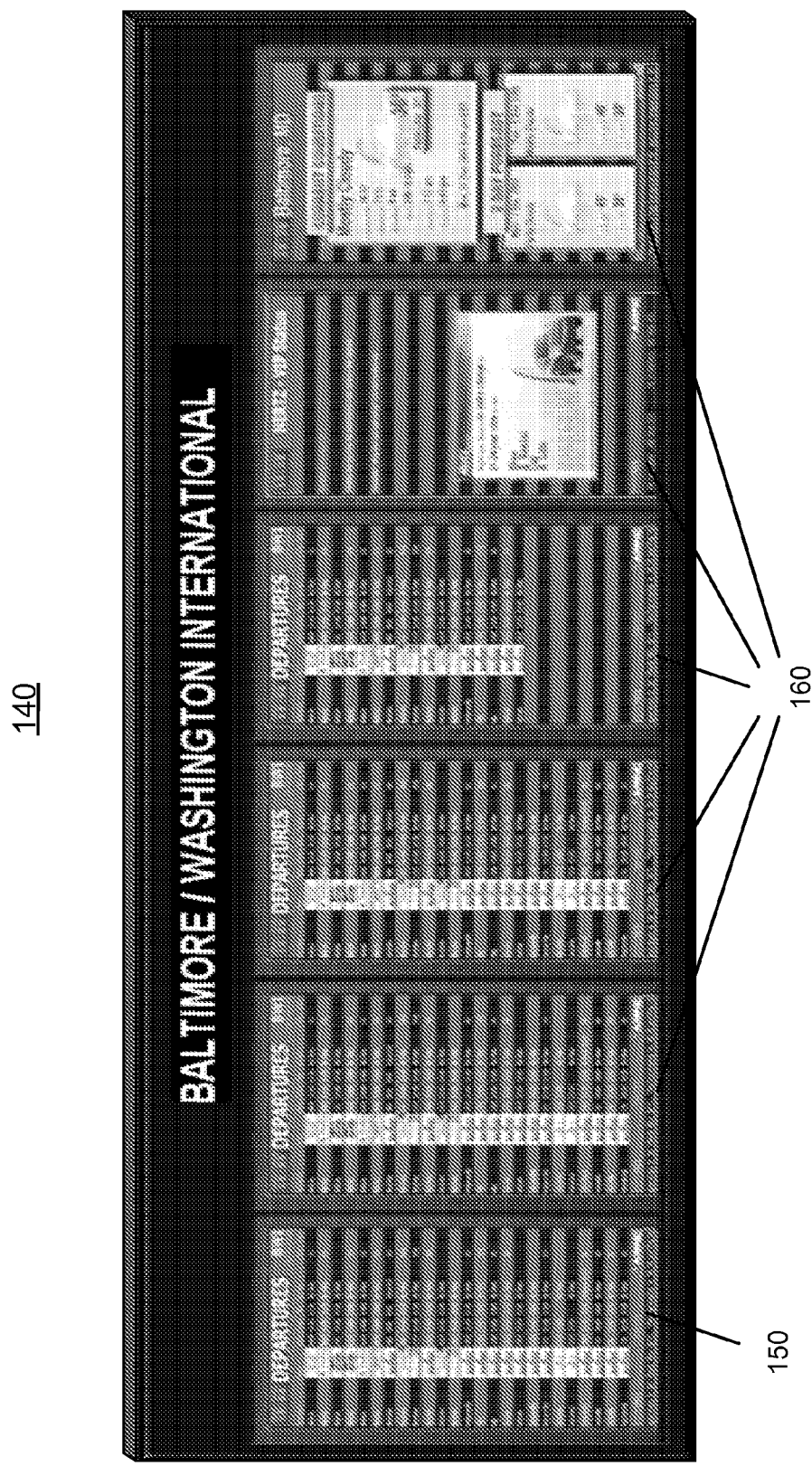
FIG. 2 is a diagram of an exemplary low-cost display bank showing various content in accordance with a possible embodiment of the disclosure.

FIG. 2 is a diagram of an exemplary low-cost display bank 140 showing various information in accordance with a possible embodiment of the disclosure. The low-cost display bank 140 may be any set of display units 150, 160 that is significantly lower in cost compared to conventional display units used in travel-related circumstances (in airports terminals, train stations, bus depots, rental car locations, restaurants located in such areas, etc.) such as expensive LCD and plasma displays. For example, such low-cost display units 150, 160 may be hundreds of dollars whereas conventional LCD and plasma displays used for the same purpose cost tens of thousands of dollars.

Only the master low-cost display unit 150 may be required to be a "smart" display unit (e.g., be able to receive and transmit information wired or wirelessly, or be able to perform some processing or formatting on such received information, etc.) The low-cost display bank 140 may also have reduced processing power and reduced features that are unneeded for its purpose. The low-cost display bank 140 of the type discussed in the disclosed embodiments also use reduced amounts of power, thus saving the users significantly on their electric bills. In this manner, the low-cost display banks 140 and display bank data management unit 120 of the disclosed embodiments may reduce airport terminal costs by the millions.

The master low-cost display unit 150 may receive a wide variety of information for display, such as travel information (e.g., arrival and departure information (for any mode of transportation), train schedules, cruise stops/schedules, subway maps or schedules, bus schedules, area/location/city maps, terminal maps, gate or port locations, rental car information (e.g., car locations numbers and/or maps, bus stop location, terminal location, etc.), baggage information (location, bag identification, etc.), advertisements, hotel or restaurant information, weather information (e.g., forecast or current weather information at current location, various destinations, etc.). The master low-cost display unit may then send the information to slave low-cost display units 160 for display.

Figure 3:
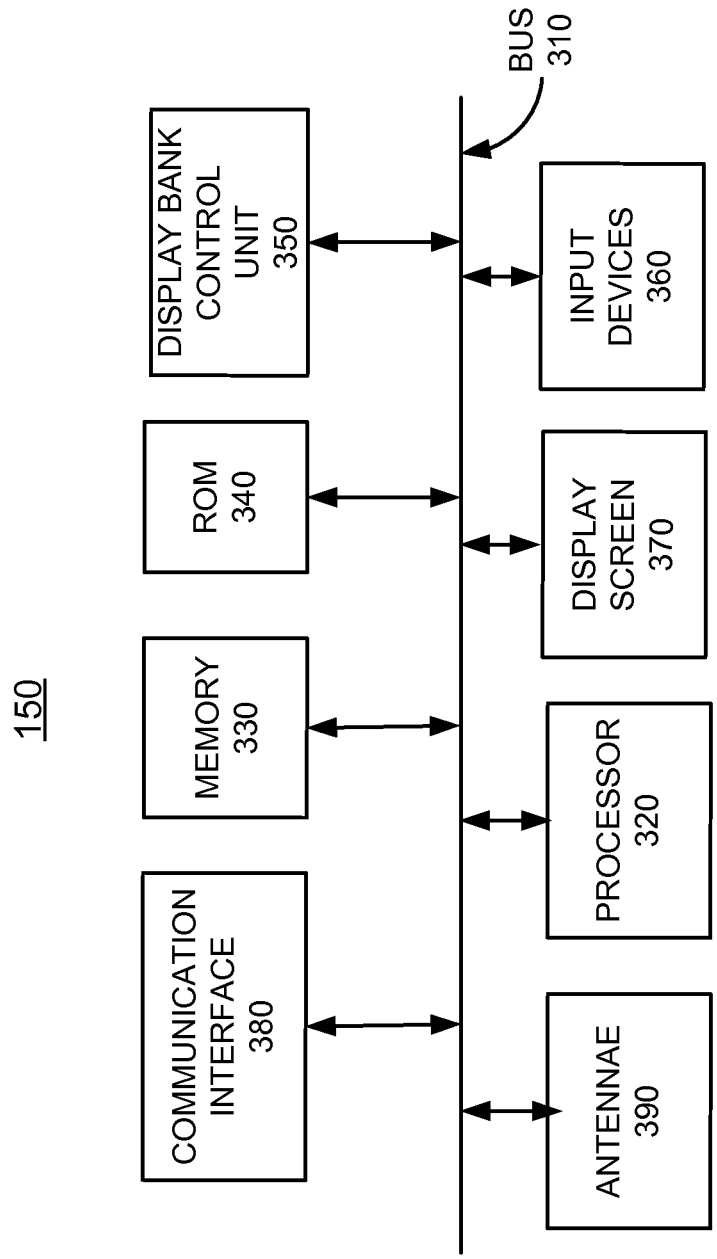
FIG. 3 is a block diagram of an exemplary master low-cost content display unit in accordance with a possible embodiment of the disclosure.

FIG. 3 is a block diagram of an exemplary master low-cost display unit 150 in accordance with a possible embodiment of the disclosure. The exemplary master low-cost display unit 150 may include a bus 310, a processor 320, a memory 330, a read only memory (ROM) 340, a display bank control unit 350, input devices 360, screen 370, a communication interface 380, and antennae 390.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any type of storage media or media drive, such as, for example, magnetic or optical recording media and its corresponding drive.

Input device 360 may include one or more conventional mechanisms that may permit a user to input information to the master low-cost display unit 150, such as a keyboard, a mouse, a pen, a voice recognition device, etc.

Communication interface 380 may include any transceiver-like mechanism that enables the master low-cost display unit 150 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. The antennae 390 may represent any antenna, modem, or other device that works in conjunction with the communication interface that facilitates the reception (and sending) of electronic signals, such as radio frequency (RF), Wi-Fi, wireless communication, remote control, infra-red, etc.

The display bank control unit 350 may control the operation of the master low-cost display unit 150, including the reception and display of data source content for display, such as travel-related information as discussed above in relation to FIG. 2, for example. The display bank control unit 350 may receive travel data through the communication interface 380 that may contains travel-related information from one or more data sources 130 and the display bank data management unit 120. The travel-related information may include arrival information, departure information, subway schedules, terminal maps, station maps, location maps, advertisements, paging information, emergency information, current time and date information, and weather information, for example. The display bank control unit 350 may then display the received travel-related information on the display screen 370 and command one or more slave low-cost display units 160 to display information on each display screen that has been assigned for display by that particular slave low-cost display units 160.

The display bank control unit 350 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

Figure 4:
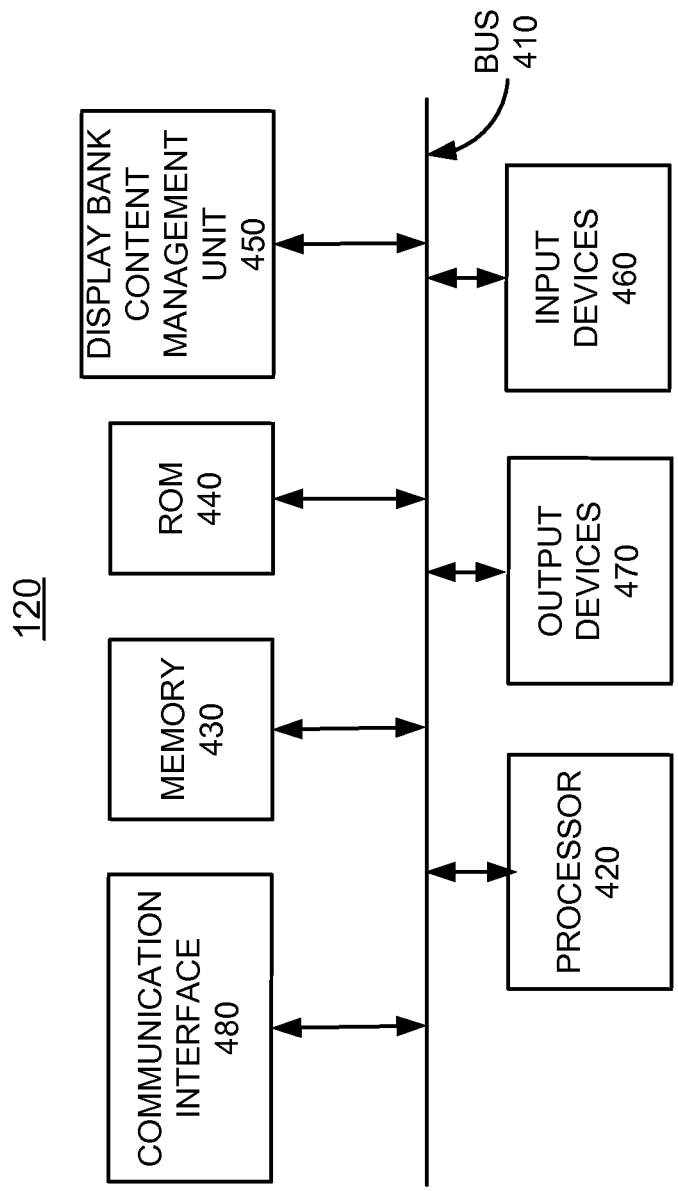
FIG. 4 is a block diagram of an exemplary display bank management unit in accordance with a possible embodiment of the disclosure.

FIG. 4 is a block diagram of an exemplary display bank data management unit 120 in accordance with a possible embodiment of the disclosure. The exemplary display bank data management unit 120 may include a bus 410, a processor 420, a memory 430, a read only memory (ROM) 440, a display bank content management unit 450, input devices 460, output devices 470, and a communication interface 480. Bus 410 may permit communication among the components of the display bank data management unit 120.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may also represent any type of storage media or media drive, such as, for example, magnetic or optical recording media and its corresponding drive.

Input device 460 may include one or more conventional mechanisms that may permit a user to input information to the display bank data management unit 120, such as a keyboard, a mouse, a pen, a voice recognition device, etc. Output device 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the display bank content management unit 450 to communicate via a network. For example, communication interface 480 may include a modem, or an Ethernet interface for communicating via a local area network (LAN). Alternatively, communication interface 480 may include other mechanisms for communicating with other devices and/or systems via wired, wireless or optical connections.

The display bank data management unit 120 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 480.

The display bank data management unit 120 and the low-cost display bank 140 illustrated in FIGS. 1-4 and the related discussion are intended to provide a brief, general description of a suitable computing environment in which the disclosure may be implemented. Although not required, the disclosure will be described, at least in part, in the general context of computer-executable instructions, such as program modules, being executed by the display bank data management unit 120 and the low-cost display bank 140, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the display bank content management unit 450 and the display bank content management unit 450 process will be described below in FIG. 5 in relation to the block diagrams shown in FIGS. 1-4.

Figure 5:
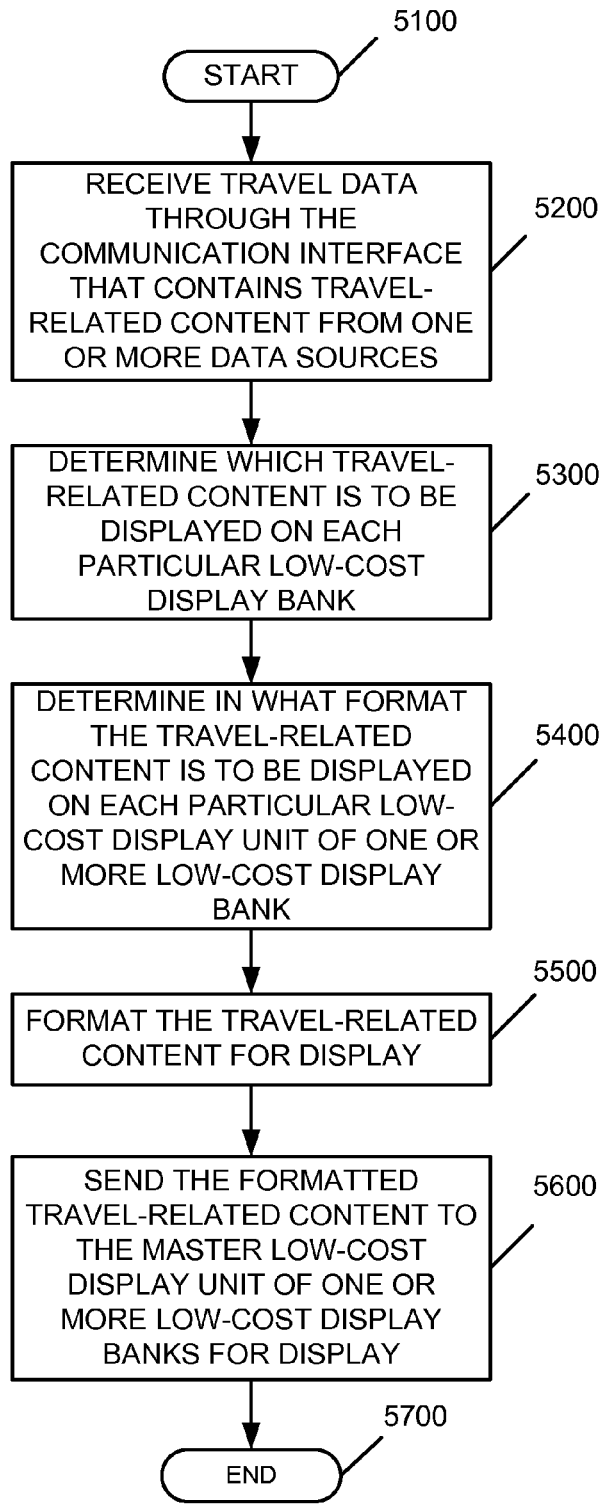
FIG. 5 is an exemplary flowchart of a low-cost display bank data management process in accordance with one possible embodiment of the disclosure.

FIG. 5 is an exemplary flowchart of a low-cost display data management process in accordance with one possible embodiment of the disclosure. The process begins at step 5100 and continues to step 5200 where the display bank content management unit 450 may receive travel data through the communication interface 480 that contains travel-related information from one or more data sources 130. The travel-related information may include arrival information, departure information, subway schedules, terminal maps, station maps, location maps, advertisements, paging information, emergency information, current time and date information, weather information, or any other possible travel related information.

At step 5300, the display bank content management unit 450 may determine which travel-related information is to be displayed on each particular low-cost display bank 140, and in possibly, each particular low-cost display unit 150, 160 of each particular low-cost display bank 140. The information content may also be scheduled so that different content is displayed on a low-cost display unit 150, 160 of the low-cost display bank 140 at different times of the day. For example, one display may display one advertisement from 5 am to noon (e.g., a breakfast restaurant) and a different advertisement from noon-11 pm (e.g., a dinner restaurant).

At step 5400, the display bank content management unit 450 may determine in what format the travel-related information is to be displayed on each particular low-cost display bank 140. In formatting the travel-related data information, the display bank content management unit 450 may determine where on the screen of each particular low-cost display unit 150, 160 the travel-related information is to be displayed. At step 5500, the display bank content management unit 450 may format the travel-related information for display (e.g., XML, etc.). At step 5600, the display bank content management unit 450 may send the formatted travel data to one or more master low-cost display unit 150 of one or more low-cost display banks 140 through the communication interface 480 for display to passengers, customers, etc. The travel-related information may be sent to one or more of the low-cost display banks 140 by wired or wirelessly technology, such as Wi-Fi, RF, modem, 802, internet, intranet, or in accordance with another possible wired or wireless method or standard. The process may then go to step 5700 and end.

Figure 6B:
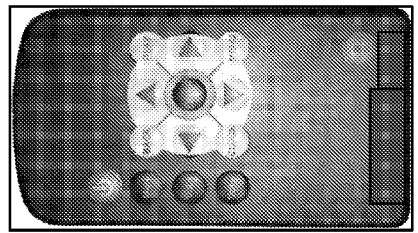
FIG. 6A is an exemplary screenshot of a possible local configuration interface for the master low-cost display unit and FIG. 6B is a possible remote control for interacting with the possible configuration interface for the master low-cost display unit in accordance with a possible embodiment of the disclosure.
Figure 6A:
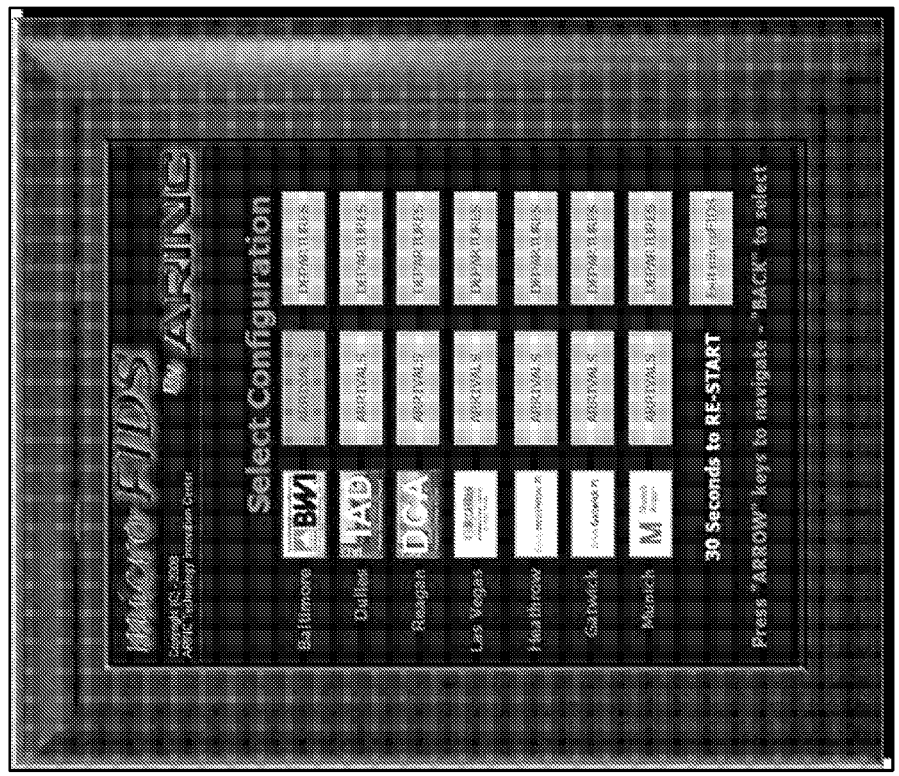

FIG. 6A is an exemplary screenshot of a possible local configuration interface 600 for the master low-cost display bank 150 in accordance with a possible embodiment of the disclosure. The local configuration interface 600 may allow a user to locally configure the low-cost display bank 140 using the master low-cost display unit 150 to display a particular venue (e.g., a particular airport (e.g., Baltimore Washington International Airport (BWI)), train station, bus station, etc.), with particular information, such as arrival, departure, weather, etc. The each of the low-cost display units 150, 160 in the low-cost display bank 140 may be configured using the master low-cost display unit 150 to display one category of travel-related information, such as departures, or may be configured to alternate the display between arrivals, departures, weather, and one or more advertisements. The low-cost display units 150, 160 in the low-cost display bank 140 may also be configured to display multiple amounts of information of the same screen, such as weather and an advertisement, for example.

In addition, if a low-cost display bank 140 is placed in a restaurant, for example, the display may also be configured to display any specials, entertainment scheduled, etc. If a low-cost display bank 140 is placed in a rental car bus, the parking spot of rental cars for VIP customers may also be displayed with arrival and/or departure information, for example. The low-cost display bank 140 may be controlled by a local computer, a touch screen (if the low-cost display units 140 are so designed), or a remote control, for example.

FIG. 6B is a possible remote control 610 for interacting with the possible configuration interface for the master low-cost display units 150 of the low-cost display bank 140 in accordance with a possible embodiment of the disclosure. The remote control 610 may contain a plurality of buttons (e.g., on/off, up down arrows, paging change, menu, etc.) to facilitate the interaction with a particular master low-cost display unit 150. In this manner, the remote control 610 may facilitate selecting display options (e.g., information, content, appearance, etc.) from menus that may appear on the low-cost display units 150, 160 in the low-cost display bank 140.

Figure 7:
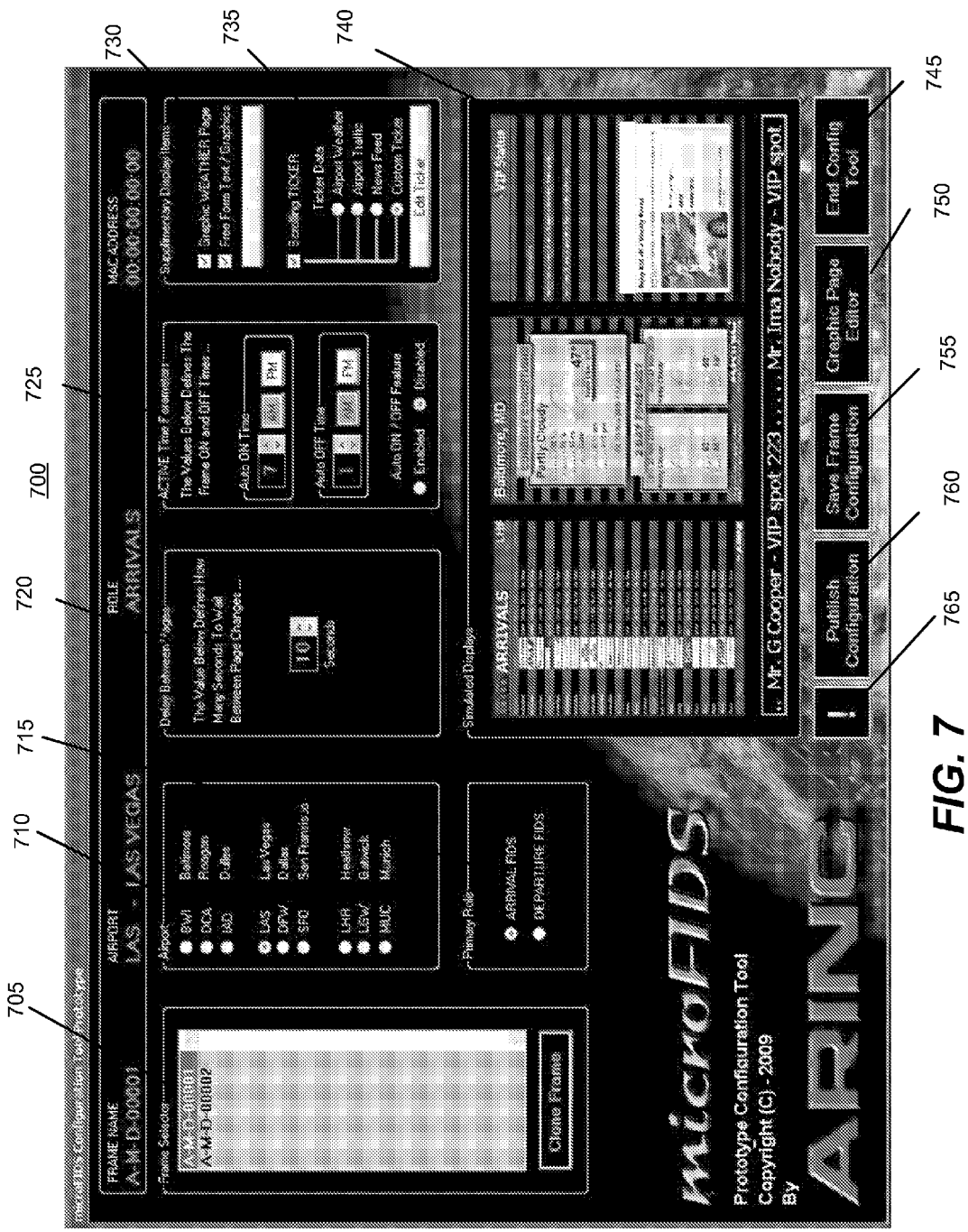
FIG. 7 is an exemplary screenshot of a remote configuration interface for the low-cost display bank in accordance with a possible embodiment of the disclosure.

FIG. 7 is an exemplary screenshot of a remote configuration interface 700 for the low-cost display bank 140 in accordance with a possible embodiment of the disclosure. The remote configuration interface 700 may be a computer, server, PDA, application device, processing device, etc. based interface which may be web-based, a stand-alone application or it may be part of a software package, for example. The remote configuration interface 700 may include menus and selection boxes that may facilitate the remote (or local) configuration parameters and creation of individual master or slave display unit 150, 160 profiles or low-cost display unit bank 140 profiles for one or more low-cost display units 140. These profiles may determine what information each low-cost display bank 140 and low-cost display unit 150, 160 in the low-cost display bank 140 will display (e.g., arrival information, departure information, weather, ticker, etc.) and how the information will be presented (e.g., position of information on the screen, delay between showing certain information, etc.).

In the example shown in FIG. 7, the remote configuration interface 700 may include a frame configuration selection box 705, a venue configuration selection box 710, a information configuration selection box 715, a delay time configuration selection box 720, an on/off time configuration selection box 725, a weather page configuration selection box 730, a ticker configuration selection box 735, a display preview box 740, an end configuration box 745, a graphic advertisement configuration selection box 750, a save configuration selection box 755, an upload configuration selection box 760, and a help configuration selection box 765. For the purposes of the disclosed embodiments, a user may be a system operator, a customer, an information technology person, owner, travel terminal worker, or any other person that may configure the information and/or appearance of one or more low-cost display banks 140.

The frame configuration selection box 705 may allow a user to select a particular low-cost display bank 140 or low-cost display unit 150, 160 within the low-cost display bank 140 to configure at one or more particular venues. For example, at an airport, a particular display bank 140 may be identified and selected that may be in a particular terminal gate area, a restaurant, bar, etc. However, the configuration may be such that all low-cost display banks 140 in a particular airport may be selected and configured display the same information or page through multiple display pages. The frame configuration selection box 705 may also allow selection of individual screens for the low-cost display units 150, 160 of an individual low-cost display bank 140 should the low-cost display units 150, 160 of the low-cost display bank 140 be configured to display multiple alternating screens.

The venue configuration selection box 710 may allow a user to select which airport, train station, bus depot, cruise line and/or port, etc. the low-cost display bank 140 on which the particular information may be displayed. The information configuration selection box 715 may be used by a user to select the information content of a particular low-cost display unit 150, 160 in a particular low-cost display bank 140, such as one or more of arrival, departure, weather, advertisement, restaurant menu/specials, etc.

The delay time configuration selection box 720 may allow the user to select the delay time between page changes on low-cost display units 150, 160 of the low-cost display bank 140 that will alternate to show more than one page at various intervals. The on/off time configuration selection box 725 may used by a user to select whether a low-cost display bank 140 is to be automatically turned on and/or off and at what time a display bank 140 will automatically turned on and/or off.

The weather/advertisement page configuration selection box 730 may be used to select if a weather and/or graphic advertisement page is to be displayed and the location of the weather to be displayed, such as at the airport, in a city, one or more destination, etc. or to select a particular advertisement and/or advertiser to be displayed. The ticker configuration selection box 735 may be used to select a display of traffic, news, custom ticker (with paging, rental car location, news, special announcements, or other information. The display preview box 740 may be used to display a preview of one or more low-cost display bank's 140 display page and configuration prior to finalizing and sending to the master low-cost display unit 150 of the low-cost display bank 140.

The end configuration box 745 may used end the configuration process for one or more display banks 140 and may enable another low-cost display bank 140 to be configured. The graphic advertisement configuration selection box 750 may be used to edit a graphic advertisement page. The save configuration selection box 755 may be used to save a low-cost display bank's 140 configuration.

The upload configuration selection box 760 may be used to upload or publish a configured low-cost display bank's 140 pages to be displayed. The help configuration selection box 765 may be used to receive help from a local help database and/or program, or from a remote help center.

Figure 8:
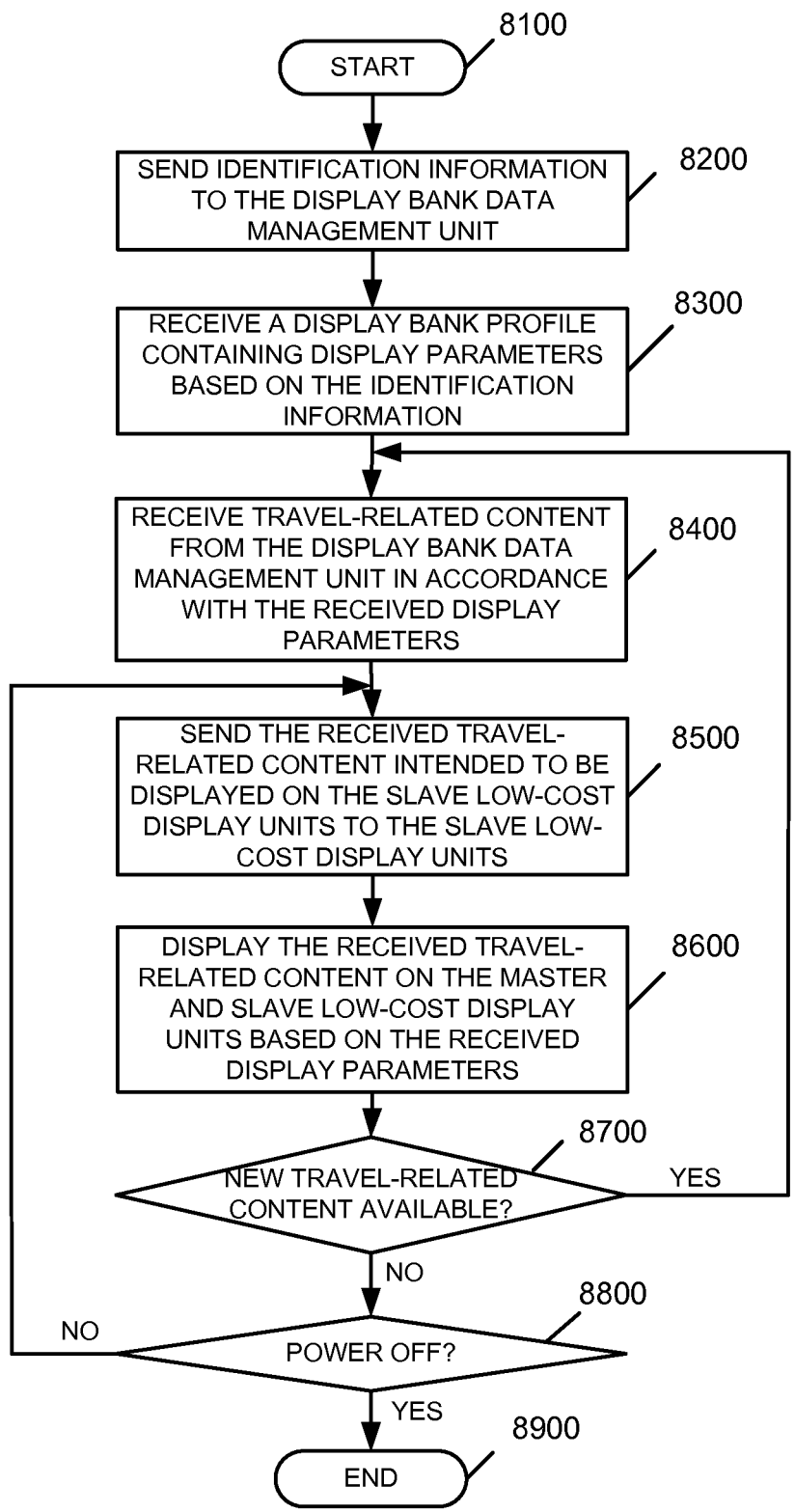
FIG. 8 is an exemplary flowchart of a master low-cost display bank process in accordance with one possible embodiment of the disclosure.

FIG. 8 is an exemplary flowchart of a master low-cost display unit process in accordance with one possible embodiment of the disclosure. The process may begin at step 8100 and may continue to step 8200 where the display bank control unit 350 may send identification information to the display bank data management unit 120 through the communication interface 380. This identification information indicates to the display bank data management unit 120 where the low-cost display bank 140 is located (e.g., at which airport, station, etc.), where within that location (e.g., terminal, gate, restaurant, etc.), and possibly information about the low-cost display bank 140 itself (e.g., size, type, model, etc.). At step 8300, the display bank control unit 350 may receive a display bank profile containing display parameters based on the identification information through the communication interface 380. These parameters may be those described in detail above in FIG. 7, for example.

At step 8400, the display bank control unit 350 may receive travel-related information from the display bank data management unit 120 in accordance with the received display parameters through the communication interface 380. The travel-related information may be received as a result of the master low-cost display unit 150 requesting the information (the information is pulled from the display bank data management unit 120) or by the display bank data management unit 120 sending the information on its on volition (the information is pushed to the master low-cost display unit 150). The travel-related information may include at least one of arrival information, departure information, subway schedules, terminal maps, station maps, location maps, advertisements, paging information, emergency information, current time and date information, or weather information, for example. Note that if the location is on a moving platform, such as a rental car bus heading to the airport from the rental car facility, the information may be updated based on the location which may be determined and updated using and known location technology, such as Global Positioning System (GPS), Radio Frequency Identification (RFID), etc.

At step 8500, the display bank control unit 350 may send the received travel-related information intended to be displayed on the one or more slave low-cost display units to the one or more slave low-cost display units 160. At step 8600, the display bank control unit 350 may display the received travel-related information on the master low-cost display unit 150 and the one or more slave low-cost display units 160 based on the received display parameters. For example, the low-cost display bank 140 location may be on a rental car bus heading to the airport from the rental car facility and the received display parameters may require that the display show departure information on the way to the airport and show VIP rental car location information and/or current weather information on the way to the rental car facility.

At step 8700, the display bank control unit 350 may determine whether new travel-related information is available from the display bank data management unit 120, such as updated flight information. This update may be performed on-demand or one a periodic basis, for example. If the display bank control unit 350 determines that new travel-related information is available from the display bank data management unit 120, the process returns to step 8400 and the display bank control unit 350 may receive travel-related information from the display bank data management unit 120 in accordance with the received display parameters through the communication interface 380, and display travel-related information on the master low-cost display unit 150 and the one or more slave low-cost display units 160 based on the received display parameters.

At step 8800, the display bank control unit 350 may determine whether a power off signal has been received. If the display bank control unit 350 determines that a power off signal has not been received, the process returns to step 8500. If the display bank control unit 350 determines that a power off signal has been received, the process may then go to step 8900 and end.

Embodiments within the scope of the present disclosed embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments are part of the scope of the disclosed embodiments. For example, the principles of the disclosed embodiments may be applied to each individual user where each user may individually deploy such a system. This enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end

What is claimed is:

1. A low-cost display bank that displays travel-related information in a public travel-related area, comprising:
   one or more slave low-cost display units that display travel-related information; and
   a master low-cost display unit that displays travel-related information, comprising:
      a communication interface that facilitates receiving of travel information by the master low-cost display unit; and
      a display bank control unit that
         sends identification information to a display bank data management unit through the communication, interface of the master low-cost display unit;
         receives a display bank unit profile containing display parameters for the one or more slave low-cost display units based on the identification information through the communication interface, the display parameters for the one or more slave low-cost display units including at least one of a location of the one or more slave low-cost display units and a time of day,
         receives travel-related information from the display bank data management unit in accordance with the received display parameters through the communication interface,
         determines what elements of the received travel-related information to send to different ones of the one or more slave low-cost display units based on the display parameters,
         sends the determined elements of the received travel-related information to be displayed on each of the one or more slave low-cost display units to the each of the one or more slave low-cost display units,
         directs display of the received travel-related information on the master low-cost display unit, and
         directs that the determined elements of the received travel-related information be displayed on the each one of the one or more slave low-cost display units based on the received display parameters,
   wherein the travel-related information includes at least one of arrival information, departure information, subway schedules, terminal maps, station maps, location maps, advertisements, paging information, emergency information, current time and date information, and weather information information, and
   the display bank control unit of the a master low-cost display unit further determines that new travel-related information is available from the display bank data management unit, receives the new travel-related information from the display bank data management unit, updates a determination of what elements of the new travel-related information to send to different ones of the one or more slave low-cost display units based on the display parameters, and displays the new travel-related information on the master low-cost display unit and the determined elements of the new travel-related information on the one or more slave low-cost display units based on the received display parameters.

2. The low-cost display bank of claim 1, wherein the location of the one or more slave low-cost display units is in one of an airport terminal, a train station, a bus terminal, a restaurant, a rental car location, a hotel, a hotel shuttle bus, and a rental car shuttle bus.

3. The low-cost display bank of claim 1, wherein the master low-cost display unit is controlled by a remote control unit in close proximity the master low-cost display unit.

4. The low-cost display bank of claim 1, wherein the travel-related information is received by the display bank control unit of the master low-cost display unit wirelessly via the communication interface.

5. A method of displaying travel-related information in a public travel-related area on a low-cost display bank having a master low-cost display unit and one or more slave low-cost display units, comprising:
   sending identification information from the master low-cost display unit to a display bank data management unit;
   receiving a display bank unit profile containing display parameters for the one or more slave low-cost display units based on the identification information via a display bank unit processor of the master low-cost display unit, the display parameters for the one or more slave low-cost display units including at least one of a location of the one or more slave low-cost display units and a time of day;
   receiving with the display bank unit processor of the master low-cost display unit travel-related information from the display bank data management unit in accordance with the received display parameters;
   determining with the display bank unit processor of the master low-cost display unit what elements of the received travel-related information to send to different ones of the one or more slave low-cost display units based on the display parameters;
   sending the determined elements of the received travel-related information intended to be displayed on the one or more slave low-cost display units from the display bank unit processor of the master low-cost display unit to the one or more slave low-cost display units;
   displaying the received travel-related information on the master low-cost display unit; and
   directing with the display bank unit processor of the master low-cost display unit that the determined elements of the received travel-related information be displayed on the each one of the one or more slave low-cost display units based on the received display parameters,
   wherein the travel-related information includes at least one of arrival information, departure information, subway schedules, terminal maps, station maps, location maps, advertisements, paging information, emergency information, current time and date information, and weather information, and
   the display bank unit processor of the master low-cost display unit (1) determines that new travel-related information is available from the display bank data management unit, (2) updates a determination of what elements of the new travel-related information to send to different ones of the one or more slave low-cost display units based on the display parameters, (3) displays the new travel-related information on the master low-cost display unit, and (4) directs display of the determined elements of the new travel-related information on the each one of the one or more slave low-cost display units based on the received display parameters.

6. The method of claim 5, wherein the location of the one or more slave low-cost display units is in one of an airport terminal, a train station, a bus terminal, a restaurant, a rental car location, a hotel, a hotel shuttle bus, and a rental car shuttle bus.

7. The method of claim 5, wherein the master low-cost display unit is controlled by a remote control unit in close proximity to the master low-cost display unit.

8. The method of claim 5, wherein the travel-related information is received by the display bank unit processor of the master low-cost display unit wirelessly.

* * * * *